UNITED STATES PATENT OFFICE.

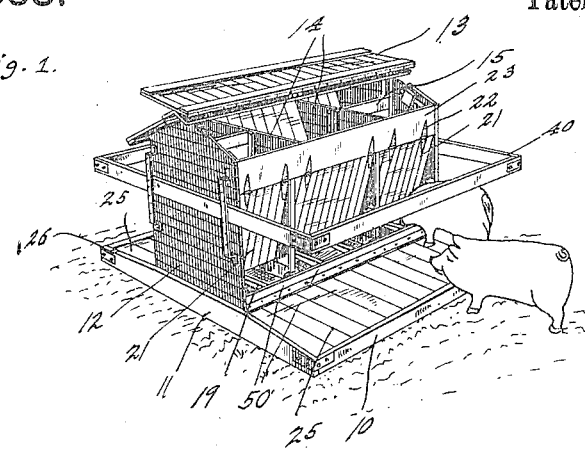

JOHN E. ROBBINS, OF GREENSBURG, INDIANA.

HOG-FEEDER.

1,257,638.  Specification of Letters Patent.  Patented Feb. 26, 1918.

Application filed August 31, 1917. Serial No. 189,051.

*To all whom it may concern:*

Be it known that I, JOHN E. ROBBINS, a citizen of the United States, residing at Greensburg, in the county of Decatur and State of Indiana, have invented a new and useful Hog-Feeder, of which the following is a specification.

It is the object of my invention to provide an automatic hog feeder, whereby the hogs can get as much feed as they require but are prevented from wasting it; whereby the rooting of the feed out of the feeder is largely prevented and any that is rooted out is caught on the movable platform so that the hogs can get it instead of being allowed to drop through and be lost; whereby any feed that is rooted over is kept comparatively clean from mud, so that the hogs can and will still eat it; whereby rain is shed off away from the feed; and whereby the locking of the platform down and of the door open, as by corn cobs or other things which might catch in the device, is prevented.

The accompanying drawing illustrates my invention. Figure 1 is a perspective view of a hog feeder embodying my invention, showing one section of the cover raised and several hogs feeding; Fig. 2 is a partial transverse vertical section through such hog feeder, with the feeding door closed; and Fig. 3 is a similar partial transverse vertical section, showing the lower part only, with the feeding door open.

I have shown my present invention in connection with the general type of hog feeder shown in my copending application Ser. No. 163,118, filed April 19, 1917, on which the present invention is an improvement.

On the base frame comprising longitudinal members 10 and transverse members 11 is mounted a storage bin 12 extending between the transverse base members 11 midway between the two longitudinal members, which bin is provided with a gable roof, of which parts are hinged to provide covers 13 which can be lifted to supply feed to the bin. The bin may be divided into any number of sections by transverse partitions 14, and if desired by removable longitudinal partitions 15 in each transverse section, the lower ends of the removable partitions 15 resting on inverted V-shaped partitions 17 which act as deflectors to throw the grain to the bottom of the bin toward the feed opening at each side along the bin floor 18. The structure is symmetrical with respect to the longitudinal partitions 15, so that it will be necessary to describe the structure only on one side thereof.

On this floor 18 at each side there are a series of cleats 19 parallel to the transverse partitions 14 to prevent the hogs from rooting lengthwise of the feeding openings of the bin, thereby in large measure preventing the hogs from rooting out the feed. At the front edge of the cleats 19 at each side there is a bottom board 20 set on edge and extending from one end of the bin 12 to the other. Coöperating with each bottom board 20 is a series of swinging doors 21, hung by hinges 22 from the lower edge of a top board 23 also extending from one end of the bin 12 to the other. When the doors 21 are swung inward the feed behind the bottom board 20 and in the spaces between the cleats 19 and the transverse partitions 14 becomes accessible to the hogs.

In order to obtain the swinging of the doors 21 automatically, a swinging platform 25 is mounted between each bottom board 20 and the adjacent longitudinal base piece 10 on pivot pins 26 carried by the transverse base members 11 close to the members 10, so that the edges of the platform 25 which are toward the bottom boards 20 may swing up and down as the hogs step on and off them. Each platform 25 is connected to the swinging doors 21 on its side of the bin in any suitable manner so that as the platform 25 is swung downward the doors 21 are swung inward and open, and vice versa. As shown, this is obtained by connecting the movable edge of the platform 25 by a series of links 27, 28, and 29 to a lever 30 carrying a counterweight 31, which tends to move the platform 25 upward. The central link 28 is pivotally connected to one end of a lever 33 mounted on a pivot bolt 34 in the end wall of the bin, the other end of such lever 33 being connected by a link 35 to an arm 36 on a shaft 37 mounted in the end walls of the bin and the partitions 14 and extending from end to end of the bin. The shaft 37 carries a series of arms 38, one or more for each associated door 21, which arms 38 are connected to links 39 pivoted to the doors 21. Thus when a hog steps on either platform 25, all the feed doors 21 on that side of the bin are opened, and he can obtain food from any of the spaces provided by the partitions 14. When the doors 21 are closed, each associated arm 38 and link 39, which form a toggle, are substantially in a straight line, so that the doors 21 cannot be opened by direct pressure against them and cannot be blown open, but require that the associated platform be depressed in order to open them. By providing a guard rail 40 around the structure, suitably supported on the bin 12, larger animals are prevented from stepping on the platforms 25, so that they cannot get at the feed behind the bottom boards 20.

Behind each door 21 is a slanting partition 45, which in the form shown is mounted on hinges 46 near the top, and which does not come down quite to the bottom board 18. The feed is stored behind this partition 45, and escapes on to the bottom board 18 only below the edge of such partition 45, so that only a small amount of feed is accessible at any one time. When the doors 21 are swung open, they strike the partitions 45, and jar them, so as to shake down the feed behind them.

At its vertically moving edge, each platform 25 is provided with a sheet metal guard plate 50, which is fastened to the platform as by screws or nails and projects obliquely upward, then over the bottom boards 20, and then downward, preferably obliquely, the upper edge of the bottom board being cut correspondingly oblique. The partitions 14 are provided with notches 51 opposite the guard plate 50, so that such guard plate may be continuous and yet its action will not be interfered with. There is enough space between the lower edge of the door 21 and the upper edge of the bottom boards 20 to allow for the movement of this guard plate as the platform 25 is moved up and down. When the platform is up, the highest part of the guard plate 50 is directly under the lower edge of the doors 21, which are then in forward or closed position, as is clear from Fig. 2. In this position, the obliquely upwardly projecting portions of the guard plates 50 serve to shed off any water which may be thrown or driven against the doors 21, as in rain storms, thereby keeping dry the feed behind the bottom boards 20. When a hog steps on to the platform 25, and depresses it, thereby opening the doors 21 by swinging them inward, the guard plates 50 are moved to the position shown in Fig. 3, fitting down tightly over the upper edge of the bottom board 20. With this arrangement, it is found that the hog roots very little feed out of the feeding space and over the bottom board 20. This may be and probably is because of the rearward slant of the free edge of the guard plate 50 where it rests on the oblique upper edge of the bottom board 20, so that any feed which is rooted on to such slanting portion of the guard plate slides back into the feeding space. However, if any feed is rooted out by the hog, it is caught by the guard plate 50 and prevented from falling through to the ground between the bottom board 18 and the platform 25, as happens if the guard plate 50 is not present. Thus any feed which is rooted over is kept accessible for the hogs, and it is found that it is eaten, instead of being wasted as would be the case if the guard plates were not present. Any corn which is thus rooted over is kept comparatively clean, by being caught on the guard plate 50 and the platform 25, instead of being buried in the mud as it would be if it dropped through onto the ground. When the hog has finished feeding and leaves the platform 25, the counterweight 31 swings the platform 25 upward and the doors 21 forward to their closed position, and the guard plate 50 is swung up with it from the position shown in Fig. 3 to the position shown in Fig. 2. Because of its narrow upper edge, any corn cobs or other obstructions which have lodged on the guard plate will fall off, so that they will not interfere with the closing of the doors, as it is found that they do in some instances if the guard plate 50 is not present.

I claim as my invention:

1. A feeding device, comprising a movable platform operable downward by the weight of an animal but tending to move upward, a feed bin provided with an inwardly opening door swinging on a horizontal axis, connections between said door and said platform so that the door is swung inwardly open when the platform is depressed, and a guard plate carried by said moving platform and projecting below said swinging door into the bin, the highest point of said guard plate being beneath the edge of the door when the door is closed so that it sheds water from the feed bin.

2. A feeding device, comprising a movable platform operable downward by the weight of an animal but tending to move upward, a feed bin provided with an inwardly opening door swinging on a horizontal axis, connections between said door and said platform so that the door is swung inwardly open when the platform is depressed, and a guard plate carried by said moving platform and projecting below said swinging door into the bin.

3. A feeding device, comprising a feed bin provided at the front with an upwardly projecting bottom board and with a door hingedly mounted above said bottom board on a horizontal axis and opening inward, a movable platform operable downward by the weight of an animal but tending to move upward, connections between said board and said platform so that the door is swung inwardly open and the platform is depressed, and a guard plate carried by said platform and projecting over said upwardly projecting bottom board, so that when the platform is depressed said guard plate engages said bottom board to prevent feed from falling down between the bottom board and the platform.

4. A feeding device, comprising a feed bin provided at the front with an upwardly projecting bottom board and with a door hingedly mounted above said bottom board on a horizontal axis and opening inward, a movable platform operable downward by the weight of an animal but tending to move upward, connections between said board and said platform so that the door is swung inwardly open and the platform is depressed, and a guard plate carried by said platform and projecting over said upwardly projecting bottom board, so that when the platform is depressed said guard plate engages said bottom board to prevent feed from falling down between the bottom board and the platform, said guard plate slanting downward on the inner side of said bottom board so that it tends to shed into the bin any grain which may get upon it.

5. A feeding device, comprising a feed bin provided at the front with an upwardly projecting bottom board and with a door hingedly mounted above said bottom board on a horizontal axis and opening inward, a movable platform operable downward by the weight of an animal but tending to move upward, connections between said board and said platform so that the door is swung inwardly open and the platform is depressed, and a guard plate carried by said platform and projecting over said upwardly projecting bottom board, so that when the platform is depressed said guard plate engages said bottom board to prevent feed from falling down between the bottom board and the platform, said guard plate being highest at an intermediate point and slanting in both ways therefrom so that it tends to shed feed into the feed bin and rain away from the feed bin.

6. A feeding device, comprising a feed bin provided at the front with an upwardly projecting bottom board and with a door hingedly mounted above said bottom board on a horizontal axis and opening inward, a movable platform operable downward by the weight of an animal but tending to move upward, connections between said board and said platform so that the door is swung inwardly open and the platform is depressed, and a guard plate carried by said platform and projecting over said upwardly projecting bottom board, so that when the platform is depressed said guard plate engages said bottom board to prevent feed from falling down between the bottom board and the platform, the highest point of said guard plate being located so that it comes under the edge of the door when the door is closed so that the guard plate sheds water away from the feed bin.

In witness whereof, I have hereunto set my hand at Greensburg, Indiana, this seventh day of August, A. D. one thousand nine hundred and seventeen.

JOHN E. ROBBINS.

Copies of this patent may be obtained for five cents each, by addressing the "Commissioner of Patents, Washington, D. C."